United States Patent
Choi et al.

(10) Patent No.: US 10,673,071 B2
(45) Date of Patent: Jun. 2, 2020

(54) POSITIVE ELECTRODE ACTIVE MATERIAL FOR LITHIUM SECONDARY BATTERY, METHOD FOR PREPARING SAME AND LITHIUM SECONDARY BATTERY COMPRISING SAME

(71) Applicant: L&F CO., LTD., Daegu (KR)

(72) Inventors: Su An Choi, Daegu (KR); Sang Hoon Jeon, Daegu (KR); Su Youn Kwon, Daegu (KR); Mi Hye Yun, Daegu (KR); Yu Jin Sohn, Daegu (KR); Ji Sun An, Daegu (KR); Bong Jun Jeong, Daegu (KR)

(73) Assignee: L&F CO., LTD., Daegu (KR)

( * ) Notice: Subject to any disclaimer, the term of this patent is extended or adjusted under 35 U.S.C. 154(b) by 0 days.

(21) Appl. No.: 16/083,765

(22) PCT Filed: Mar. 2, 2017

(86) PCT No.: PCT/KR2017/002271
§ 371 (c)(1),
(2) Date: Sep. 10, 2018

(87) PCT Pub. No.: WO2017/155240
PCT Pub. Date: Sep. 14, 2017

(65) Prior Publication Data
US 2019/0131624 A1  May 2, 2019

(30) Foreign Application Priority Data

Mar. 9, 2016 (KR) .................. 10-2016-0028367

(51) Int. Cl.
*H01M 4/505* (2010.01)
*H01M 10/0525* (2010.01)
(Continued)

(52) U.S. Cl.
CPC ............ *H01M 4/505* (2013.01); *C01G 53/50* (2013.01); *H01M 4/366* (2013.01); *H01M 4/525* (2013.01);
(Continued)

(58) Field of Classification Search
None
See application file for complete search history.

(56) References Cited

FOREIGN PATENT DOCUMENTS

| JP | 2012190731 A | 10/2012 |
|---|---|---|
| KR | 20120099375 A | 9/2012 |

(Continued)

OTHER PUBLICATIONS

Nurpeissova et al "Effect of Titanium Addition as Nickel Oxide Formation Inhibitor in Nickel-Rich Cathode Material for Lithium-Ion Batteries" Journal of Power Sources vol. 299, pp. 425-433, 2015.

(Continued)

*Primary Examiner* — Wyatt P McConnell
(74) *Attorney, Agent, or Firm* — Lex IP Meister, PLLC

(57) ABSTRACT

In an embodiment of the present invention, a positive active material for a lithium secondary battery is represented by Formula 1, and includes a core including a compound having a core portion and a surface portion, and the compound has a lower L3/L2 intensity ratio of Ni in the surface portion than an L3/L2 intensity ratio of Ni in the core portion.

$$Li[Li_zA_{(1-z-a)}D_a]E_bO_{2-b}$$ [Formula 1]

(In the above formula (1), A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.05$, $0 \leq b \leq 0.05$, $0.3 \leq \alpha \leq 0.9$, $0.05 \leq \beta \leq 0.4$, and $0.05 \leq \gamma \leq 0.4$.)

(Continued)

(The L3/L2 intensity ratio of Ni is the oxidation number of Ni measured by electronic energy loss spectroscopy (EELS).).

16 Claims, 3 Drawing Sheets

(51) Int. Cl.
    *C01G 53/00*     (2006.01)
    *H01M 4/62*     (2006.01)
    *H01M 4/36*     (2006.01)
    *H01M 4/525*     (2010.01)
    *H01M 4/02*     (2006.01)

(52) U.S. Cl.
    CPC ....... *H01M 4/628* (2013.01); *H01M 10/0525* (2013.01); *C01P 2002/52* (2013.01); *C01P 2002/54* (2013.01); *C01P 2004/04* (2013.01); *C01P 2006/40* (2013.01); *H01M 2004/028* (2013.01)

(56) References Cited

FOREIGN PATENT DOCUMENTS

| | | |
|---|---|---|
| KR | 2015/0063955 A | 6/2015 |
| KR | 2015/0090862 A | 8/2015 |
| KR | 101577180 B1 | 12/2015 |
| WO | WO-2016/032290 A1 | 3/2016 |

OTHER PUBLICATIONS

Sun et al "A Novel Cathode Material with a Concentration-Gradient for High-Energy and Safe Lithium-Ion Batteries" Advanced Functional Materials vol. 20, pp. 485-491, 2010.

[FIG. 1]
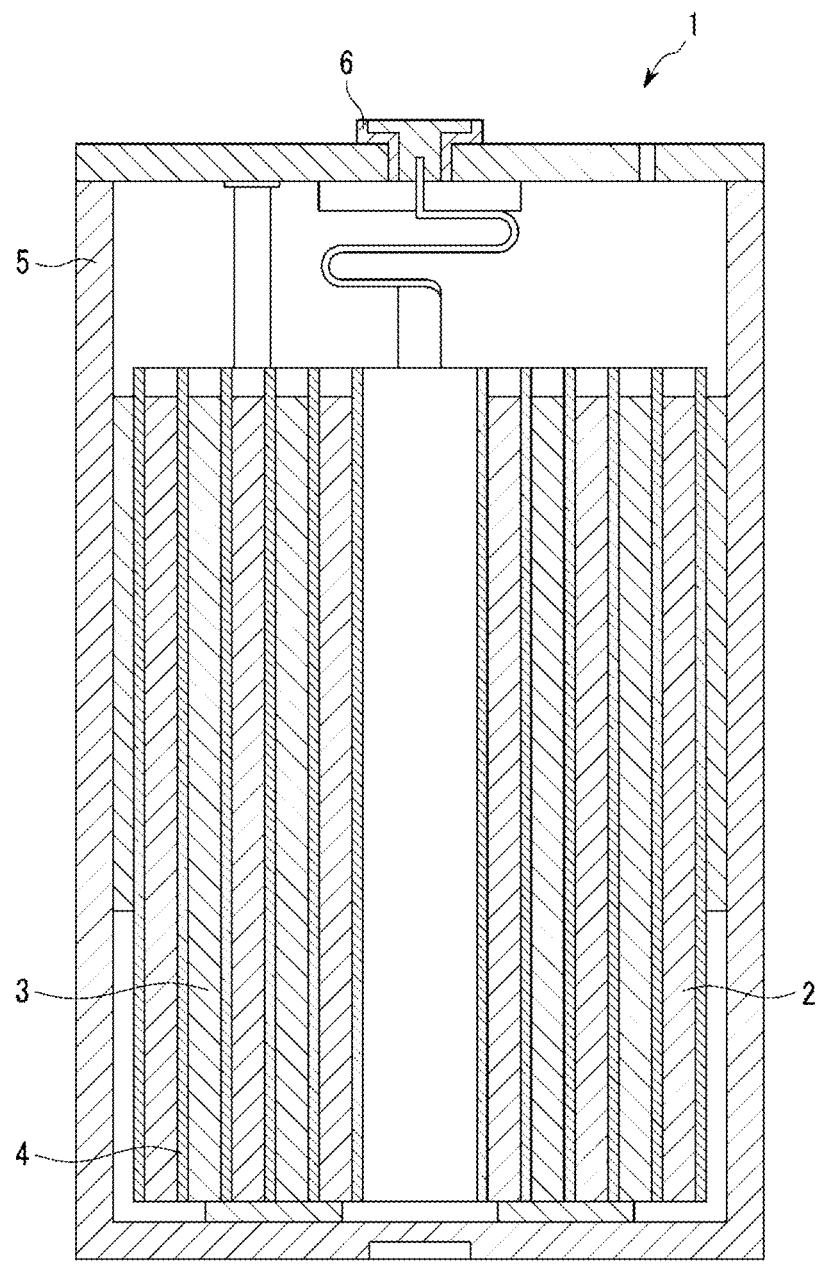

[FIG. 2]
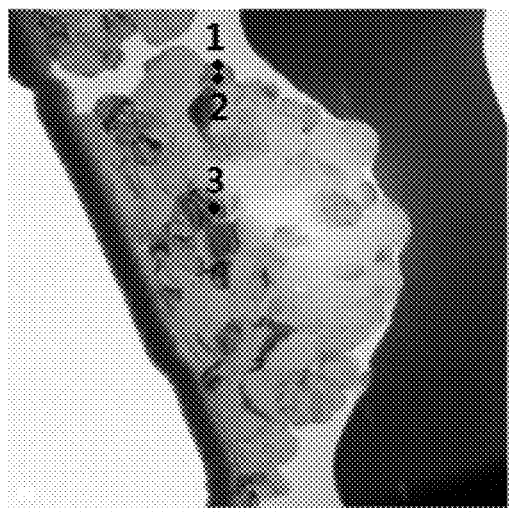
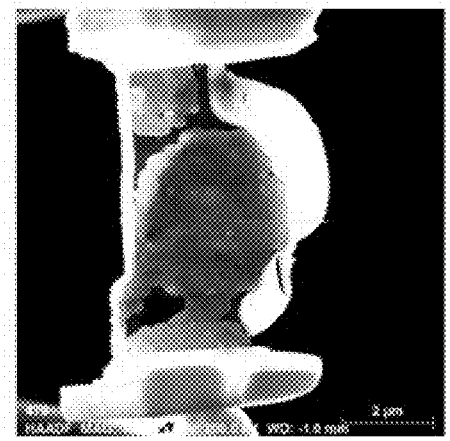

[FIG. 3]
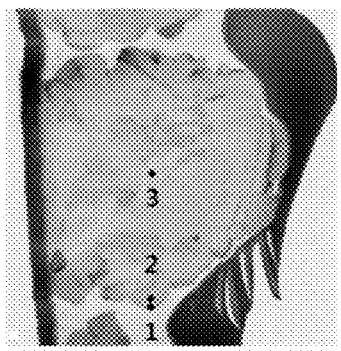
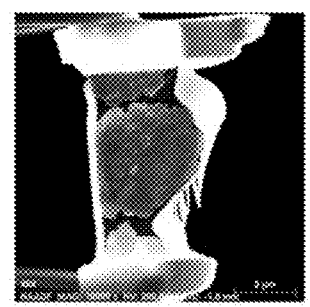
[FIG. 4]
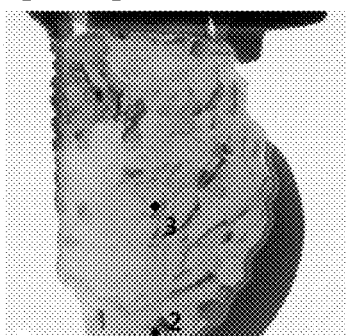
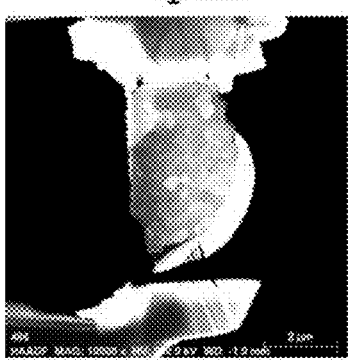

POSITIVE ELECTRODE ACTIVE MATERIAL FOR LITHIUM SECONDARY BATTERY, METHOD FOR PREPARING SAME AND LITHIUM SECONDARY BATTERY COMPRISING SAME

CROSS-REFERENCE TO RELATED APPLICATIONS

This application is the National Stage of International Application No. PCT/KR2017/002271, filed Mar. 2, 2017, which claims the benefit of Korean Application No. 10-2016-0028367, filed Mar. 9, 2016. The contents of both applications are hereby incorporated by reference in their entirety.

FIELD OF THE INVENTION

A positive active material for a lithium secondary battery and a method of producing the positive active material for a lithium secondary battery are disclosed.

DESCRIPTION OF THE RELATED ART

In recent times, portable electronic equipment with reduced size and weight has been increasingly used in accordance with development of electronic industries.

Batteries generate electrical power using an electrochemical reaction material for a positive electrode and a negative electrode. Lithium secondary batteries generate electrical energy due to chemical potential changes during intercalation/deintercalation of lithium ions at positive and negative electrodes.

The lithium secondary batteries include a material reversibly intercalating or deintercalating lithium ions during charge and discharge reactions as both positive and negative active materials, and are filled with an organic electrolyte or a polymer electrolyte between the positive and negative electrodes.

For the positive active material for a lithium secondary battery, composite metal compounds has been used, and as examples thereof, composite metal oxides such as $LiCoO_2$, $LiMn_2O_4$, $LiNiO_2$, $LiMnO_2$, and the like are researched.

Among the positive active materials, a manganese-based positive active material such as $LiMn_2O_4$ and $LiMnO_2$ is easy to synthesize, costs less than other materials, has excellent thermal stability compared to other active materials, and is environmentally friendly. However, this manganese-based material has relatively low capacity.

$LiCoO_2$ has good electrical conductivity, a high cell voltage of about 3.7 V, and excellent cycle-life, stability, and discharge capacity, and thus is a presently-commercialized representative material. However, $LiCoO_2$ is so expensive that makes up more than 30% of the cost of a battery, and thus may reduce price competitiveness.

In addition, $LiCoO_2$ has the highest discharge capacity among the above positive active materials, but is hard to synthesize. Furthermore, nickel therein is highly oxidized and may deteriorate the cycle-life of a battery and an electrode, and thus may have severe self-discharge and deterioration of reversibility. Further, it may be difficult to commercialize due to incomplete stability.

DESCRIPTION OF THE INVENTION

Technical Problem

A positive active material for a lithium secondary battery having high capacity and excellent cycle-life characteristics and a lithium secondary battery including the positive active material are provided.

Technical Solution

In an embodiment of the present invention, a positive active material for a lithium secondary battery is represented by Formula 1, and includes a core including a compound having a core portion and a surface portion, and the compound has a lower L3/L2 intensity ratio of Ni in the surface portion than an L3/L2 intensity ratio of Ni in the core portion.

$$Li[Li_zA_{(1-z-a)}D_a]E_bO_{2-b} \quad \text{[Formula 1]}$$
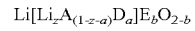

(In the above Formula 1, A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.05$, $0 \leq b \leq 0.05$, $0.3 \leq \alpha \leq 0.9$, $0.05 \leq \beta \leq 0.4$, and $0.05 \leq \gamma \leq 0.4$.)

(The L3/L2 intensity ratio of Ni is the oxidation number of Ni measured by electronic energy loss spectroscopy (EELS).)

In Formula 1, it may be that $-0.05 \leq z \leq 0.05$, $0.6 \leq \alpha \leq 0.9$, $0.05 \leq \beta \leq 0.2$, and $0.05 \leq \gamma \leq 0.2$.

In Formula 1, D may be one element selected from the group consisting of Zr, Ti, Mg, Al, and combinations thereof.

In addition, in Formula 1, a mole doping ratio of D may be 0.001.

A coating layer may be further located outside the core. In addition, the coating layer may include Al and/or B.

Furthermore, a weight ratio of the coating layer to the total weight of the entire positive active material may be 0.05 to 0.5.

In addition, the coating layer may further include F.

The core portion may be represented by the following Formula 2, and the surface portion may be represented by Formula 3.

$$Li[Li_zA_{(1-z-a)}D_a]E_bO_{2-b} \quad \text{[Formula 2]}$$
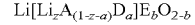

(In the above Formula 2, A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.01$, $0 \leq b \leq 0.05$, $0.3 \leq \alpha \leq 0.9$, $0.05 \leq \beta \leq 0.4$, and $0.05 \leq \gamma \leq 0.4$.)

$$Li[Li_zA_{(1-z-a)}D_a]E_bO_{2-b} \quad \text{[Formula 3]}$$
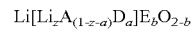

(In the above Formula 3, A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0.03 \leq a \leq 0.05$, $0 \leq b \leq 0.05$, $0.3 \leq \alpha \leq 0.9$, $0.05 \leq \beta \leq 0.4$, and $0.05 \leq \gamma \leq 0.4$.)

An L3/L2 intensity ratio of Ni in the core portion may be 1.5 to 1.6, and an L3/L2 intensity ratio of Ni in the surface portion may be 1.2 to 1.4.

In another embodiment of the present invention, a method of producing a positive active material for a lithium secondary battery includes: uniformly adhering a D supply material to a surface of a transition metal precursor by dry mixing the transition metal precursor and the D supply material; adding a lithium supply material to the mixture and dry mixing the same; and obtaining a core represented by the following Formula 1 and including a compound including a core portion and a surface portion by sintering the mixture.

$$Li[Li_zA_{(1-z-a)}D_a]E_bO_{2-b}$$ [Formula 1]

(In the above formula (1), A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.05$ 8, $0 \leq b \leq 0.05$, $0.3 \leq \alpha \leq 0.9$, $0.05 \leq \beta \leq 0.4$, and $0.05 \leq \gamma \leq 0.4$.)

After the obtaining a core, it may further include dry mixing the core and the coating layer forming material, and forming the coating layer on a surface of the core by sintering the mixture.

In the step of obtaining the core by sintering the mixture, a temperature of the sintering may be 800 to 1050° C.

In the step of the forming the coating layer on a surface of the core by sintering the mixture, the temperature of the sintering may be 300 to 450° C.

The D supply material may include Zr, Ti, Mg, Al, or combinations thereof.

The coating layer forming material may include Al and/or B.

The compound may have a lower L3/L2 intensity ratio of Ni in the surface portion than an L3/L2 intensity ratio of Ni in the core portion.

In another embodiment of the present invention, a lithium secondary battery includes a positive electrode including a positive active material for lithium secondary battery, a negative electrode including a negative active material, and an electrolyte.

Effects of the Invention

In an embodiment of the present invention, a positive active material for a lithium secondary battery having excellent battery characteristics, a method for producing the same, and a lithium secondary battery including the same, are provided.

BRIEF DESCRIPTION OF THE DRAWINGS

FIG. 1 is a schematic view of a lithium secondary battery.
FIG. 2 is TEM result of Example 1.
FIG. 3 is TEM result of Example 2.
FIG. 4 is TEM result of Comparative Example 1.

DETAILED DESCRIPTION OF THE EMBODIMENTS

Hereinafter, embodiments of the present invention are described in detail. However, these embodiments are exemplary, the present invention is not limited thereto, and the present invention is defined by the scope of claims.

In an embodiment of the present invention, a positive active material for a lithium secondary battery is represented by Formula 1, and includes a core including a compound having a core portion and a surface portion, and the compound has a lower L3/L2 intensity ratio of Ni in the surface portion than an L3/L2 intensity ratio of Ni in the core portion.

$$Li[Li_zA_{(1-z-a)}D_a]E_bO_{2-b}$$ [Formula 1]

In the above Formula 1, A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.05$, $0 \leq b \leq 0.05$, $0.3 \leq \alpha \leq 0.9$, $0.05 \leq \beta \leq 0.4$, and $0.05 \leq \gamma \leq 0.4$.

(The L3/L2 intensity ratio of Ni is the oxidation number of Ni measured by electronic energy loss spectroscopy (EELS).)

In Formula 1,
it may be that $-0.05 \leq z \leq 0.05$, $0.6 \leq \alpha \leq 0.9$, $0.05 \leq \beta \leq 0.2$, and $0.05 \leq \gamma \leq 0.2$.

In Formula 1, D may be one element selected from the group consisting of Zr, Ti, Mg, Al, and a combination thereof.

In addition, in Formula 1, a mole doping ratio of D may be 0.001.

The positive active material can improve the battery characteristics of the lithium secondary battery. More specifically, in an embodiment of the present invention, it can provide a positive active material having improved cycle-life characteristics.

In Formula 1, as the Ni content increases, a high capacity characteristic can be embodied.

However, as the Ni content increases, the stability and the cycle-life characteristics are deteriorated.

Through the doping, the cycle-life characteristics of the battery can be improved and thermal stability can be improved. If the content of the doping element is too small, the effect is not sufficiently exhibited, and if the content is too large, the cycle-life characteristic deteriorates extremely.

In a generic positive active material having a high Ni content, $Ni^{2+}$ distribution is increased on the surface portion. As NiO is formed through $Ni^{2+}$, battery characteristics are deteriorated.

In an example of the present invention, excellent battery characteristics are exhibited without extreme deterioration of cycle-life even when the Ni content is high by stabilization of a surface structure according to an increase in the oxidation number on the surface as the oxidation number of Ni is increased as the surface portion as the oxidation number of Ni is changed by doping.

A coating layer may be further located outside the core.

In addition, the coating layer may include Al and/or B.

Furthermore, a weight ratio of the coating layer to the total weight of the entire positive active material may be 0.05 to 0.5.

The positive active material of Formula 1 including the coating layer further improves battery characteristics by suppressing side reactions with the electrolyte through surface modification.

Furthermore, the coating layer may include F

By further including F in the coating layer, the wettability with the electrolyte is lowered, so that the side reaction can be suppressed to further stabilize the surface.

The positive active material may be a positive active material in which the oxidation number of Ni is controlled by doping or coating.

In addition, the positive active material may be a positive active material in which an L3/L2 intensity ratio of Ni in the surface portion is lower than an L3/L2 intensity ratio of Ni in the core portion by doping.

The L3/L2 intensity ratio of Ni is a value measured through the TEM-EELS spectrum of Ni measured by electronic energy loss spectroscopy (EELS).

The EELS measures the amount of loss by changing the energy of the incident electrons or measures the scattering angle distribution of electrons scattered after the electrons are incident to investigate the interaction of the target material and the electrons or investigate the energy state and the electron state of the 'target material. In EELS, when an electron beam of a constant energy is applied to a target material such as an atom, a molecule, or a solid, loss of incident electron energy due to interaction between the target material, and the energy loss is referred to as electron energy loss.

In an example of the present invention, the oxidation number of Ni is controlled by doping. Specifically, by controlling the doping amount of D, the oxidation number of Ni can be controlled. More specifically, the value of a in Formula 1 in the core portion may be 0 to 0.01, and the value of a in the surface portion may be 0.03 to 0.05.

An L3/L2 intensity ratio of Ni in this controlled core portion may be 1.5 to 1.6, and an L3/L2 intensity ratio of Ni in the surface portion may be 1.2 to 1.4.

In another embodiment of the present invention, a method of producing a positive active material for a lithium secondary battery includes: uniformly adhering a D supply material to a surface of a transition metal precursor by dry mixing the transition metal precursor and the D supply material; adding a lithium supply material to the mixture and dry mixing the same; and obtaining a core represented by the following Formula 1 and including a compound including a core portion and a surface portion by sintering the mixture.

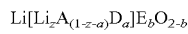  [Formula 1]

(In the above formula (1), A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.05$, $0 \leq b \leq 0.05$, $0.3 \leq \alpha \leq 0.9$, $0.05 \leq \beta \leq 0.4$, and $0.05 \leq \gamma \leq 0.4$.)

In the step of obtaining the core by sintering the mixture, a temperature of the sintering may be 800 to 1050° C.

The D supply material may include Zr, Ti, Mg, Al, or combinations thereof.

In the step of the forming the coating layer on a surface of the core by sintering the mixture, the temperature of the sintering may be 300 to 450° C.

If the temperature of the sintering is less than 300° C., the reactivity between the coating material and the positive active material is low, and the coating material is loose, so that the coating effect is difficult to expect. In addition, if the temperature of the sintering is higher than 450° C., the Al and B supply materials are excessively adhered to the compound, so that the initial capacity of the battery may be decreased and the cycle-life characteristics may be deteriorated at room temperature, high temperature, and low temperature.

The description of the manufactured positive active material is the same as in the above-described embodiment of the present invention and its description is not additionally provided.

In yet another embodiment of the present invention, a lithium secondary battery includes a positive electrode, a negative electrode, and an electrolyte, wherein the positive electrode includes a current collector and a positive active material layer formed on the current collector, and the positive active material layer includes the positive active material.

The positive active material is the same as in the above-described embodiment of the present invention, and its description is not additionally provided.

The positive active material layer includes a binder and a conductive material.

The binder improves binding properties of positive active material particles with one another and with a current collector, and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode. Any electrically conductive material can be used as a conductive agent unless it causes a chemical change, and examples of the conductive material include a carbon-based material such as natural graphite, artificial graphite, carbon black, acetylene black, ketjen black, and carbon fiber, a metal-based material such as a metal powder or a metal fiber of copper, nickel, aluminum, silver, and the like, and a conductive polymer such as a polyphenylene derivative, or a mixture thereof The negative electrode includes a current collector and a negative active material layer formed on the current collector, and the negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon (low temperature fired carbon), a hard carbon, a mesophase pitch carbonized product, fired coke, and the like.

The lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

The material being capable of doping and dedoping lithium may include Si, $SiO_x$ ($0 < x < 2$), a Si—Y alloy (wherein Y is an element selected from the group consisting of an alkali metal, an alkaline-earth metal, a Group 13 element, a Group 14 element, a transition metal, a rare earth element, and a combination thereof, and is not Si), Sn, $SnO_2$, or Sn—Y (wherein Y is an element selected from the group consisting of an alkali metal, an alkaline-earth metal, a Group 13 element, a Group 14 element, a transition metal, a rare earth element, and a combination thereof, and is not Sn). At least one of these materials may be mixed with $SiO_2$. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium vanadium oxide, and the like.

The negative active material layer may include a binder, and optionally a conductive material.

The binder improves binding properties of negative active material particles with one another and with a current collector, and examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode, and any electrically conductive material may be used as a conductive agent unless it causes a chemical change, and examples of the conductive material include: a carbon-based material such as natural graphite, artificial graphite, carbon black, acetylene black, ketjen black, and carbon fiber; a metal-based material such as a metal powder or a metal fiber of copper, nickel, aluminum, silver, and the like; a conductive polymer such as a polyphenylene derivative; or a mixture thereof.

The current collector may be selected from the group consisting of a copper foil, a nickel foil, a stainless steel foil, a titanium foil, a nickel foam, a copper foam, a conductive polymer substrate coated with a metal, and a combination thereof.

The current collector may be Al, but is not limited thereto. The negative electrode and the positive electrode may be manufactured by a method including mixing each active material, a conductive material, and a binder into an active material composition and coating the composition on a current collector. The electrode manufacturing method is well known, and thus is not described in detail in the present specification. The solvent includes N-methylpyrrolidone and the like, but is not limited thereto.

The electrolyte includes a non-aqueous organic solvent and a lithium salt.

The non-aqueous organic solvent serves as a medium for transmitting ions taking part in the electrochemical reaction of a battery.

The organic solvent may further include one selected from an ester-based, ether-based, ketone-based, or alcohol-based solvent, and an aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone and the like. The alcohol-based solvent may include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used alone or in a mixture, and when the organic solvent is used in a mixture, the mixture ratio may be controlled in accordance with desirable battery performance.

The carbonate-based solvent is prepared by mixing a cyclic carbonate and a linear carbonate. In this case, the cyclic carbonate and linear carbonate are mixed together in a volume ratio of 1:1 to 1:9, which may produce enhanced performance.

The non-aqueous organic solvent according to an embodiment of the present invention may further include an aromatic hydrocarbon-based organic solvent in addition to the carbonate-based solvent. The carbonate-based solvent and aromatic hydrocarbon-based organic solvent may be mixed together in a volume ratio of 1:1 to 30:1.

The aromatic hydrocarbon-based organic solvent may be an aromatic hydrocarbon-based compound represented by Formula 4.

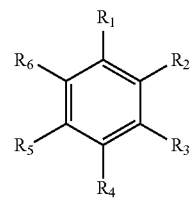

[Formula 4]

(In Chemical Formula 4, $R_1$ to $R_6$ are independently hydrogen, a halogen, a C1 to C10 alkyl group, a haloalkyl group, or a combination thereof.)

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include vinylene carbonate or an ethylene carbonate-based compound represented by Chemical Formula 5 to improve the cycle-life.

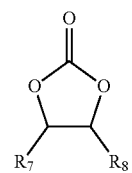

[Formula 5]

(In Chemical Formula 5, $R_7$ and $R_8$ are independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.)

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving the cycle-life may be desirably used within an appropriate range.

The lithium salt dissolved in an organic solvent supplies a battery with lithium ions, basically operates the lithium secondary battery, and improves transportation of the lithium ions between positive and negative electrodes. Examples of the lithium salt include one or more supporting salts selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)$ $(C_yF_{2y+1}SO_2)$, wherein x and y are natural numbers, LiCl, LiI, and $LiB(C_2O_4)_2$ (lithium bis(oxalato) borate; LiBOB). A concentration of the lithium salt may be in a range of about 0.1 M to about 2.0 M. When the lithium salt is included at the above concentration range, an electrolyte may have excellent performance and lithium ion mobility due to optimal electrolyte conductivity and viscosity.

The lithium secondary battery may further include a separator between the negative electrode and the positive electrode. The separator includes polyethylene, polypropylene, or polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator may be used.

The lithium secondary battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on its shape. In addition, it may be a bulk type and a thin film type depending on size. Structures and manufacturing methods for lithium ion batteries pertaining to this disclosure are well known in the art.

FIG. 1 shows a representative structure of a lithium secondary battery of the present invention. As shown in FIG. 1, the lithium secondary battery 1 includes a battery case 5 including an electrolyte solution impregnated in a positive electrode 3, a negative electrode 2, and a separator 4 between the positive electrode 3 and the negative electrode 2, and a sealing member 6 sealing the battery case 5.

Hereinafter, examples of the present invention and comparative examples are described. These examples, however, are not in any sense to be interpreted as limiting the scope of the invention.

EXAMPLES

Example 1

An NCM composite transition metal hydroxide (at a mole ratio of Ni:Co:Mn=80:10:10), a dispersed $ZrO_2$ powder, and a $TiO_2$ powder were dry-mixed at a weight ratio of 100:0.2:0.3 with a blender. After uniformly attaching the $ZrO_2$ powder and the $TiO_2$ powder on the surface of the composite transition metal hydroxide particles, 1.025 mol of LiOH was dry-mixed with 1 mol of the composite transition metal hydroxide having the $ZrO_2$ powder and the $TiO_2$ powder uniformly attached on the surface at a ratio of Li/Metal=1.025. The dry-mixed powder was heat-treated at 800° C. for 8 hours to manufacture a lithium composite compound.

Example 2

An NCM composite transition metal hydroxide (at a mole ratio of Ni:Co:Mn=80:10:10), a dispersed $ZrO_2$ powder, and a $TiO_2$ powder were dry-mixed at a weight ratio of 100:0.2:0.3 with a blender. After uniformly attaching the $ZrO_2$ powder and the $TiO_2$ powder on the surface of the composite transition metal hydroxide particles, 1.025 mol of LiOH was dry-mixed with 1 mol of the composite transition metal hydroxide having the $ZrO_2$ powder and the $TiO_2$ powder uniformly attached on the surface at a ratio of Li/Metal=1.025. The dry-mixed powder was heat-treated at 800° C. for 8 hours to manufacture a lithium composite compound.

The Zr and Ti-doped lithium composite compound, an $Al(OH)_3$ powder, and a $B_2O_3$ powder were dry-mixed at a weight ratio of 100:0.4:0.2 and then sintered, so that the $Al(OH)_3$ powder and the $B_2O_3$ powder might be uniformly attached on the surface of the lithium composite compound. The dry-mixed powder was heat-treated at 400° C. for 6 hours to manufacture a positive active material.

Comparative Example 1

1.025 mol of LiOH was dry-mixed with 1 mol of the NCM composite transition metal hydroxide (at a mole ratio of Ni:Co:Mn=80:10:10) at a ratio of Li/Metal=1.025 with a blender. The dry-mixed powder was heat-treated at 800° C. for 8 hours to manufacture a lithium composite compound.

Manufacture of Coin Cell 95 wt % of each positive active material prepared in the examples and comparative example, 2.5 wt % of carbon black as a conductive agent, and 2.5 wt % of PVDF as a binder were added to 5.0 wt % of N-methyl-2 pyrrolidone (NMP) as a solvent to prepare a positive electrode slurry.

The positive electrode slurry was coated to be 20 to 40 μm thick on an aluminum (Al) thin film as a positive electrode current collector, vacuum-dried, and roll-pressed, manufacturing a positive electrode.

As for a negative electrode, a Li-metal was used.

The positive electrode, the Li-metal as a counter electrode, and a 1.15 M $LiPF_6$ EC:DMC (1:1 vol %) as an electrolyte solution were used to manufacture a coin cell type of half-cell.

EXPERIMENTAL EXAMPLE

Experimental Example 1

Evaluation of Battery Characteristics

Table 1 shows initial formation at 4.5 V and 45° C., and then capacity at each $1^{st}$ cycle, $20^{th}$ cycle, and $30^{th}$ cycle and cycle-life characteristic data of the examples and comparative example.

TABLE 1

|  | Formation Discharge capacity (mAh/g) | Efficiency | 1CY discharge capacity | 20CY discharge capacity | 30CY discharge capacity | Cycle-life (20CY/1CY, %) | Cycle-life (30CY/1CY, %) |
|---|---|---|---|---|---|---|---|
| Example 1 | 220.01 | 90.12 | 217.91 | 195.04 | 178.04 | 89.50 | 81.70 |
| Example 2 | 219.27 | 90.24 | 215.43 | 194.89 | 181.18 | 90.47 | 84.10 |
| Comparative Example 1 | 221.17 | 88.81 | 216.46 | 179.24 | 160.27 | 82.81 | 74.04 |

As can be seen from Table 1, the doped Example 1 showed excellent battery characteristics as compared with Comparative Example 1.

More specifically, Example 1 in which the core portion is doped has excellent cycle-life characteristics at a high temperature and a high voltage as compared with Comparative Example 1 which is not doped.

Further, in Example 2 including a coating layer on the surface portion, excellent battery characteristics can be confirmed.

Experimental Example 2

Electron Energy Loss Spectroscopy Measurement

Table 2 shows the relative values of the oxidation number of Ni measured by TEM-EELS of the positive active materials prepared in the examples and comparative example. FIG. 2 and FIG. 4 are TEM results for the examples and comparative example in Table 2. Table 2 shows the numerical value of the relative oxidation number of Ni, which means that the lower the value of Ni L3/L2, the higher the oxidation number of Ni.

TABLE 2

| Example | Ni L3/L2 | Example | Ni L3/L2 | Comparative Example | Ni L3/L2 |
|---|---|---|---|---|---|
| 1 | 1.26 | 1 | 1.36 | 1 | 1.50 |
| 2 | 1.29 | 2 | 1.38 | 2 | 1.35 |
| 3 | 1.54 | 3 | 1.53 | 3 | 1.28 |

Referring to Table 2, it is confirmed in Example 1 and Example 2 that the value of Ni L3/L2 is lower and the oxidation number of Ni is higher in the surface portions (1, 2) than in the core portion (3). In Comparative Example 1, it can be seen that the value of Ni L3/L2 is high and the oxidation number of Ni is low in the surface portions (1, 2). As a result, it can be predicted that $Ni^{2+}$ distribution is increased on the surface portion. In Example 1 and Example 2, it is confirmed that $Ni^{2+}$ is controlled by doping and/or coating, and as a result, the oxidation number of Ni in the surface portion is relatively high.

The present invention is not limited to the exemplary embodiments and may be embodied in various modifications, and it will be understood by a person of ordinary skill in the art to which the present invention pertains that the present invention may be carried out through other specific embodiments without modifying the technical idea or essential characteristics thereof. Therefore, the aforementioned embodiments should be understood to be exemplary but not limiting the present invention in any way.

DESCRIPTION OF SYMBOLS

| 1: Lithium secondary battery | 2: Negative electrode |
| 3: Positive electrode | 4: Separator |
| 5: Battery case | 6: Sealing member |

The invention claimed is:

1. A positive active material for a lithium secondary battery, said material comprising a core having a core portion and a surface portion, each portion containing a compound of Formula 1, $$Li[Li_zA_{(1-z-a)}D_a]E_bO_{2-b}$$ [Formula 1]

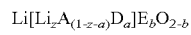

wherein
the compound in the surface portion has a lower L3/L2 intensity ratio of Ni, i.e., the oxidation number of Ni measured by electronic energy loss spectroscopy, than that in the core portion, an L3/L2 intensity ratio of Ni in the surface portion being 1.2 to 1.4, and an L3/L2 intensity ratio of Ni in the core portion being 1.5 to 1.6; in Formula 1, A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.05$, $0 \leq b \leq 0.05$, $0.3 \leq \alpha \leq 0.9$, $0.05 \leq \beta \leq 0.4$, and $0.05 \leq \gamma \leq 0.4$.

2. The positive active material for a lithium secondary battery of claim 1, wherein, in Formula 1, $-0.05 \leq z \leq 0.05$, $0.6 \leq \alpha \leq 0.9$, $0.05 \leq \beta \leq 0.2$, and $0.05 \leq \gamma \leq 0.2$.

3. The positive active material for a lithium secondary battery of claim 1, wherein in Formula 1, D is one element selected from the group consisting of Zr, Ti, Mg, Al, and combinations thereof.

4. The positive active material for a lithium secondary battery of claim 1, wherein in Formula 1, a mole doping ratio of D is 0.001 to 0.01.

5. The positive active material for a lithium secondary battery of claim 1, wherein the positive active material further includes a coating layer located outside the core.

6. The positive active material for a lithium secondary battery of claim 5, wherein the coating layer includes Al and/or B.

7. The positive active material for a lithium secondary battery of claim 5, wherein a weight ratio of the coating layer to the total weight of the entire positive active material is 0.05 to 0.5.

8. The positive active material for a lithium secondary battery of claim 6, wherein the coating layer further comprises F.

9. The positive active material for a lithium secondary battery of claim 1, wherein the compound in the core portion is represented by Formula 2 and the compound in the surface portion is represented by Formula 3:

$$Li[Li_zA_{(1-z-a)}D_a]E_bO_{2-b} \quad \text{[Formula 2]}$$

in Formula 2, A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.01$, $0 \leq b \leq 0.05$, $0.3 \leq \alpha \leq 0.9$, $0.05 \leq \beta \leq 0.4$, and $0.05 \leq \gamma \leq 0.4$;

$$Li[Li_zA_{(1-z-a)}D_a]E_bO_{2-b} \quad \text{[Formula 3]}$$

in Formula 3, A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0.03 \leq a \leq 0.05$, $0 \leq b \leq 0.05$, $0.3 \leq \alpha \leq 0.9$, $0.05 \leq \beta \leq 0.4$, and $0.05 \leq y \leq 0.4$.

10. A method of producing a positive active material for a lithium secondary battery, the method comprising:
uniformly adhering a D supply material to a surface of a transition metal precursor by dry-mixing the transition metal precursor and the D supply material;
adding a lithium supply material and dry-mixing the mixture; and
sintering the mixture to obtain a core including a core portion and a surface portion, each portion containing a compound of Formula 1:

$$Li[Li_zA_{(1-z-a)}D_a]E_bO_{2-b} \quad \text{[Formula 1]}$$

wherein
the compound in the surface portion has a lower L3/L2 intensity ratio of Ni, i.e., the oxidation number of Ni measured by electronic energy loss spectroscopy, than that in the core portion, an L3/L2 intensity ratio of Ni in the surface portion being 1.2 to 1.4, and an L3/L2 intensity ratio of Ni in the core portion being 1.5 to 1.6;
in Formula (1), A is $Ni_\alpha Co_\beta Mn_\gamma$, D is at least one element selected from the group consisting of Na, K, Mg, Ca, Sr, Ni, Co, Ti, Al, B, Si, Sn, Mn, Cr, Fe, V, Zr, Nb, and Mo, E is at least one element selected from the group consisting of P, F, and S, $-0.05 \leq z \leq 0.1$, $0 \leq a \leq 0.05$, $0 \leq b \leq 0.05$, $0.3 \leq a \leq 0.9$, $0.05 \leq \beta \leq 0.4$, and $0.05 \leq \gamma \leq 0.4$.

11. The method of producing a positive active material for a lithium secondary battery of claim 10, further comprising,
dry-mixing the core thus obtained and a coating layer-forming material; and
sintering the mixture to form a coating layer on the surface of the core.

12. The method of producing a positive active material for a lithium secondary battery of claim 10, wherein, the sintering step is performed at 800 to 1050° C.

13. The method of producing a positive active material for a lithium secondary battery of claim 11, wherein, the second sintering step is performed at 300 to 450° C.

14. The method of producing a positive active material for a lithium secondary battery of claim 10, wherein the D supply material comprises Zr, Ti, Mg, Al, or combinations thereof.

15. The method of producing a positive active material for a lithium secondary battery of claim 11, wherein the coating layer-forming material comprises Al and/or B.

16. A lithium secondary battery, comprising:
a positive electrode including a positive active material for a lithium secondary battery of claim 1;
a negative electrode including a negative active material; and
an electrolyte.

* * * * *